July 23, 1957     S. H. SVENSSON     2,800,053
REFRACTOMETRIC CELL

Filed April 6, 1954     2 Sheets-Sheet 1

INVENTOR
Svante Harry Svensson
BY Pierce, Scheffler & Parker
ATTORNEYS

INVENTOR
Svante Harry Svensson
BY Pierce, Scheffler & Parker
ATTORNEYS

United States Patent Office

2,800,053
Patented July 23, 1957

2,800,053

REFRACTOMETRIC CELL

Svante Harry Svensson, Sundbyberg, Sweden, assignor to LKB-Produkter Fabriksaktiebolag, Mariehall, Sweden, a Swedish company Application April 6, 1954, Serial No. 421,251

Claims priority, application Sweden October 16, 1953

7 Claims. (Cl. 88—14)

This invention relates to a refractometric cell for the measurement of the refractivity difference between two media, the first of which is a reference medium and the second of which is a medium to be compared.

Figure 1:
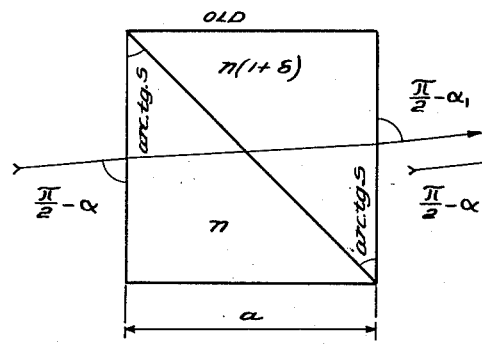
Figure 3:
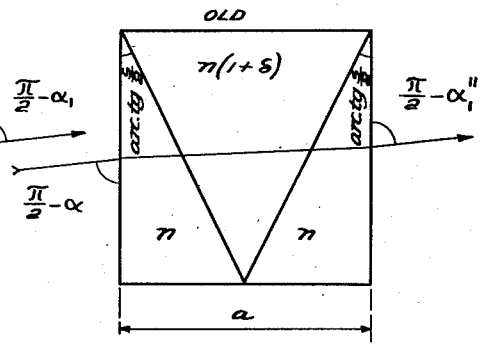
Figure 2:
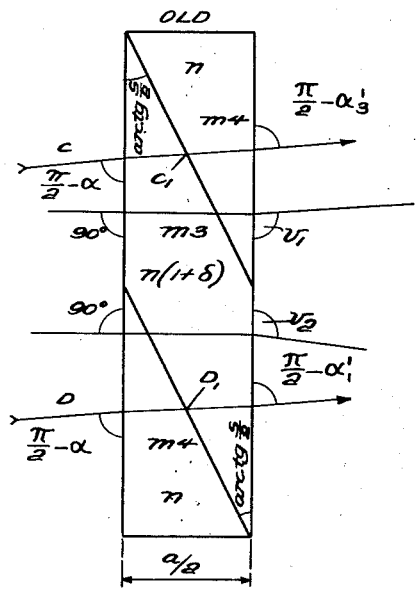
Figure 4:
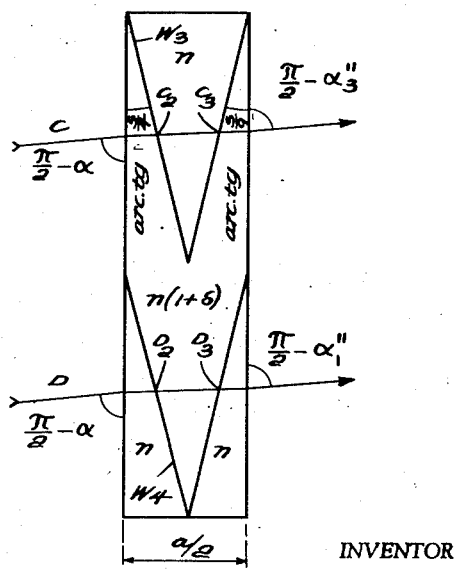
Figure 5:
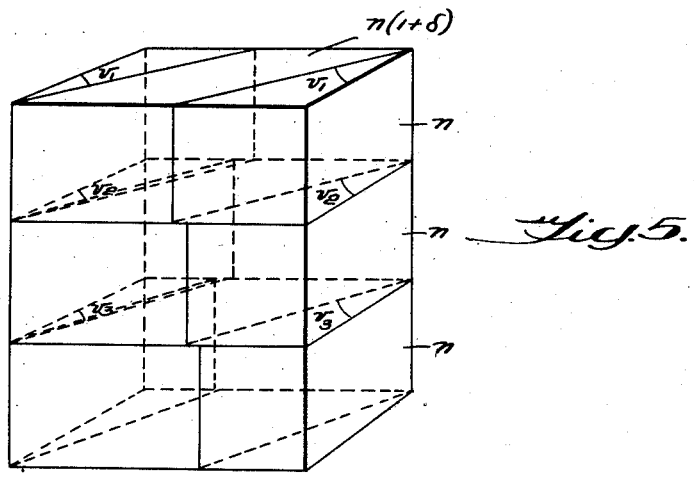
Figure 6:
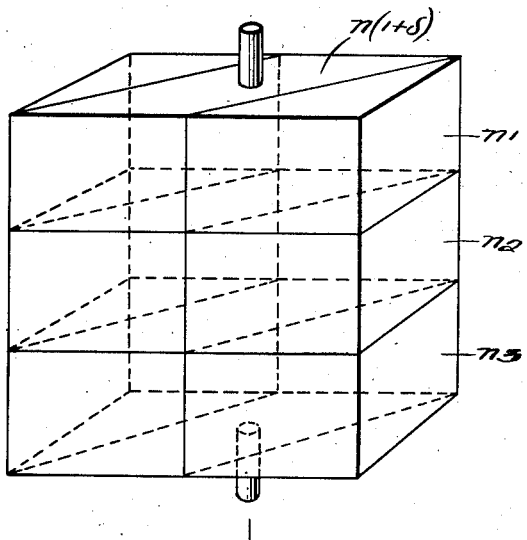

The invention is illustrated in the accompanying drawings in which:

Fig. 1 illustrates a previously known cell having two hollow prisms of the same refracting power, Fig. 2 illustrates another known cell in which the two parts of the cell each corresponds to the cell of Fig. 1 before and after turning, Fig. 3 illustrates a composite cell which is equivalent to two separate cells of Fig. 1, Fig. 4 illustrates another form of cell embodying the invention, Fig. 5 illustrates the parallel cells forming together a composite cell in which the angles between the entrance and exit walls and the inner walls are different, and Fig. 6 shows a composite cell comprising three partial cells adapted to contain different media.

So called differential-prismatic cells, the principle of which is evident from Fig. 1, have since a long time been used for measurement of small refractivity differences, e. g. between a solution and a corresponding solvent. Such a cell consists of two hollow prisms of numerically the same refracting power, but of opposite signs. For small differences in refractivity, $n\delta$, and for small entrance angles $\alpha$, the angular deflection in such a cell is given by the equation:

$$\alpha' - \alpha = n\delta \tan v = S n\delta \qquad (1)$$

where $S = \tan v$ is the sensitivity of the cell. There is thus a linear dependence between the refractivity difference and the angular deflection, which makes the cell convenient in use.

For higher values of the refractivity difference, Equation 1 is no longer exactly valid, since quadratic, cubic etc. terms then begin to be noticeable and cause deviations from the linear dependence. The inventor has investigated the refractivity difference at which this deviation becomes perceptible, and has then arrived at the following inequality for the range of linear response of the cell in Fig. 1:

$$n\delta \leq \frac{1}{S}\sqrt{\frac{2n}{R}} \qquad (2)$$

Here R is the optical resolving power, i. e. the reciprocal of the least refractivity difference that can be revealed with certainty by the instrument. For $S=1$ and $R=10^5$, this limiting value is as low as 0.00516.

According to the present invention, this range of linear response is enlarged by the construction of certain types of composite differential-prismatic cells. Three circumstances then contribute to the desired result.

If the cell in Fig. 1 is turned through 180° round an axis perpendicular to the plane of the paper, an identical cell is obtained where the two media have changed places. In the first approximation, this cell deflects the light just as much in the opposite direction. By reading the difference in light deflection before and after such a turning, one can consequently double the sensitivity as well as the optical resolving power. In other words, by using such a technique, one can retain the same sensitivity and resolving power if the sensitivity and resolution of the cell are reduced to the half of their original values. According to Equation 2, such a reduction of both R and S should lead to an increase of the range of linear response by a factor of $2\sqrt{2}$, but an accurate mathematical analysis shows that the increase remains at 100 percent.

Instead of making the measurement in a cell according to Fig. 1 before and after turning, one can use a cell according to Fig. 2, in which the upper half is the cell in Fig. 1 before, and the lower half the same cell after the turning. If such a cell is placed in the way of the parallel light from a collimator, it will give rise to two light beams which form a certain angle with each other. On focusing them, two images of the collimator slit are obtained, the mutual distance of which is proportional to the refractivity difference.

If the cell in Fig. 1 is turned 180° round an axis in the plane of the paper perpendicular to the optic axis, one obtains a cell in which $S=\tan v$ has the opposite sign and in sequence of the two media is reversed. In the first approximation, such a cell deflects the light the same amount in opposite direction compared with the first cell. If the original cell is coupled in series with the cell so turned, so that the light passes first one cell, then the other, a cell combination is obtained which has the double sensitivity and optical resolving power. In other words, on series coupling of two cells, one can retain sensitivity and optical resolution unaltered if one reduces the data of the separate cells to the half. The mathematical analysis shows that one can double the range of linear response even in this way.

Instead of using two separate cells according to Fig. 1, one can construct a composite cell according to Fig. 3, which has the same optical action. Such cells are already described in the literature, but nobody has earlier noticed their greater range of linear response compared to that of the cell in Fig. 1.

The third circumstance that contributes to a considerable increase of the linear range of certain composite cells is connected with the fact that the angular deflection can be expressed by a power series in $\delta$:

$$\alpha' - \alpha = S n\delta + A\delta^2 + B\delta^3 + \ldots \qquad (3)$$

of which Equation 1 is the first approximation. The coefficients A, B, etc. are functions of the sensitivity S, of the entrance angle $\alpha$ and of the refractivity $n$. A turning of the cell in Fig. 1 round different axes does not alter the main term $Sn\delta$, but it does alter the coefficients A, B, etc. By suitable combinations of separate cells, consisting in parallel coupling, series coupling or both, the quadratic term in Equation 3 can be brought to disappear, which results in a considerable increase of the linear range.

The accurate mathematical analysis, which will soon be published in The Journal of the Optical Society of America, shows that the type of cell depicted in Fig. 2 and that shown in Fig. 4 possess very large ranges of linear response. For the first cell, we have the equation:

$$\alpha_1' - \alpha_3' = 2nS\delta + \frac{n\delta^3 S^3}{6}(2n^2 + 3 + 6S^2) \qquad (4)$$

from which the following range of linearity can be derived:

$$n\delta \leq 0.0473 \qquad (5)$$

for $S=\frac{1}{2}$ and $R=\frac{1}{2}\cdot 10^5$. (These data for the included separate cells give the sensitivity of 1 and the resolving power of $10^5$ for the composite cell.)

For the cell according to Fig. 4, the equation is valid:

$$\alpha_1'' - \alpha_3'' = 4nS\delta + \frac{nS^3\delta^3}{3}(8n^2+9+18S^2) \qquad (6)$$

for an entrance angle=0. From this equation the following range of linearity is derived:

$$n\delta \leq 0.0519 \qquad (7)$$

for $S=\frac{1}{4}$ and $R=\frac{1}{4}\cdot 10^5$ (which gives a sensitivity of 1 and a resolving power of $10^5$ for the composite cell). To sum up, it can thus be said that these cells possess a linearity about 10 times better than that of the simple, most commonly used cell according Fig. 1.

In Fig. 5 the sample has the refractive index $n(1+\delta)$ and the reference medium in each of the three parallel cells has the index $n$. The angles between the entrance and exit walls and the inner walls are different in the three cells viz $V_1$, $V_2$ and $V_3$ respectively.

In Fig. 6 the three parallel cells contain a sample medium having the refractive index $n(1+\delta)$. The three cells contain different reference media having the refractive indices $n_1$, $n_2$ and $n$. The spaces for the sample medium are interconnected and sample medium is supplied through a pipe at the top and withdrawn through a pipe at the bottom as indicated by the arrows.

As shown in Fig. 2 two rays pass from one medium to the other in opposite order at the deflecting phase boundaries. In other words, at $c_1$, the ray $c$ passes from the medium $m_4$ to the medium $m_3$. Consequently, the angles $v_1$ and $v_2$ between the exit wall and the two light rays are not equal.

If we now also consider the fact that these linearity ranges, about 0.05 wide, extend in both directions from the refractivity of the reference medium, we arrive at the conclusion that only one reference medium for every $\frac{1}{10}$ unit in refractivity is required for using the simple Equation 1. Staying at $R=10^4$, the range of linear response becomes 2.16 times greater. At a sensitivity of unity, only two reference media of the refractivities 1.4 and 1.6 are needed to make the whole range between 1.3 and 1.7 linear.

When the refractive index of flowing solutions is to be measured or recorded, it may nevertheless be inconvenient to change reference media during a proceeding recording. It can therefore be advantageous to construct multicells with several storeys. Each storey in such a doubly compound cell should then have the same appearance in a horizontal section, but the different storeys differ from each other by having different reference media. The compartments for the reference media are thus insulated from each other, while those for the flowing solution are interconnected, so that the solution can pass through them in series.

The extension of the linearity range is in the main inversely proportional to the sensitivity of the composite cell. At certain measurements within narrow refractivity intervals, one can thus advantageously use cells of a high sensitivity, while at measurements within larger intervals the sensitivity must be reduced in order to get a linear dependence. Consequently it can also be advantageous to construct cells with several storeys in which every storey is characterized by different S-values, but contains the same reference medium.

The reference medium need not necessarily be a liquid but can also be a rigid body within those refractivity intervals where optically, mechanically and chemically satisfactory material is available. Such cells, e. g. with glass as a reference medium, are cheaper to make than cells with exclusively hollow prisms.

I claim:

1. Refractometric cell for measurement of the difference in refractivity between two media, said cell having mutually parallel entrance and exit walls to be oriented perpendicularly to the collimator axis in a refractometer, said cell containing at least two compartments for the two media to be compared, and carrying at least one pair of mutually parallel, oblique internal walls separating the media, the distance between the two members of each pair being such that one portion of the collimated beam of light passes only one member, while another portion of the collimated beam passes only the other member, the subsequent pairs of mutually parallel internal walls all making the same angle with the outer walls, but of alternating positive and negative signs in the direction of the collimator axis.

2. Refractometric cell as claimed in claim 1, containing only one pair of mutually parallel, oblique internal walls, said internal walls and the entrance and exit walls forming a body having a rhomboidal cross-section.

3. Refractometric cell as claimed in claim 1, containing two pairs of mutually parallel, oblique inner partition walls, said partition walls and the entrance and exit walls forming a body having the cross-section of two rhomboids having one side in common and parallel with the entrance and exit walls, said two rhomboids being mutual mirror images with respect to said common side.

4. Composite refractometric cell unit comprising at least two cells of the kind described in claim 1, with such a mutual orientation that all entrance and exit walls are mutually parallel and that every portion of a collimated beam of light perpendicular to said walls passes only one component cell.

5. Composite cell unit as claimed in claim 4, in which at least one of the spaces between external and internal walls consists of a solid reference medium with a known refractivity, the component cells of the cell unit containing different solid reference media.

6. Composite cell unit as claimed in claim 4, in which the component cells of the cell unit are characterized by different angles between external and internal walls.

7. Composite cell unit as claimed in claim 1, in which at least one of the compartments of each cell contains a fluid which is to be measured, all compartments for said fluid being interconnected in series.

References Cited in the file of this patent

UNITED STATES PATENTS

| | | |
|---|---|---|
| 1,264,374 | DeFlorez | Apr. 30, 1918 |
| 2,445,044 | Stamm et al. | July 13, 1948 |
| 2,612,814 | Glasser | Oct. 7, 1952 |
| 2,630,042 | Sheffer et al. | Mar. 3, 1953 |
| 2,686,454 | Ruska | Aug. 17, 1954 |